3,519,444
STATIC MOLD RELEASE AGENT
Lloyd H. Brown, Crystal Lake, and Daniel S. P. Eftax, Barrington, Ill., assignors to The Quaker Oats Company, Chicago, Ill., a corporation of New Jersey
No Drawing. Filed Apr. 12, 1968, Ser. No. 721,112
Int. Cl. B28b 7/36
U.S. Cl. 106—38.24                           1 Claim

ABSTRACT OF THE DISCLOSURE

A method of making static molds which includes coating the shaping surface with an aqueous release agent suspension comprising specified quantities of: gel forming mineral powder, such as Western bentonite; lubricating powder such as graphite; and soap.

BACKGROUND OF THE INVENTION

This invention relates to the art of making sand shapes, particularly those shapes bound with furfuryl alcohol resins, for use in the foundry industry. The high strength and excellent adhesive qualities associated with the furfuryl alcohol resins are widely known in the foundry industry; however, the very adhesiveness of the resin leads to a common difficulty when the resin is used in the fabrication of sand shapes, such as sand cores and molds. Because of the highly adhesive character of the resin, the cured sand shapes often tenaciously adhere to the shaping surface. Hence, it is often extremely difficult to remove the cured sand shapes from the shaping means. While various release agents have been suggested, all of the agents heretofore available suffered from serious deficiencies. It is highly desirable that the release agent be stable, that is, that the components of the release agent remain in suspension and undergo no significant change for prolonged periods of time. It is also desirable that the release agent be adaptable to various methods of application, e.g. painting or spraying. It is also highly desirable that the release agents provide a coating of sufficient permanence that the coated shaping means can be used many times before recoating is necessary. It is of paramount importance that the release agent effectively prevent adherence of the cured sand shape to the shaping surface.

SUMMARY OF THE INVENTION

We have discovered that all of the above mentioned desirable features are achieved in a method of making static molds which includes the steps of applying to the shaping surface of the static mold an aqueous release agent comprising a mixture of the following ingredients:

| | Parts, inclusive |
|---|---|
| Water | 45–200 |
| Gel forming mineral powder | 3–12 |
| Lubricating powder | 20–30 |
| Soap | 10–20 | permitting the release agent to dry prior to the application of the material to be shaped by the shaping surface.

As used herein, the term "gel forming mineral powder" is intended to include any mineral (i.e. inorganic) powder, which, when admixed with water, forms a gel. These are also known as "swelling" powders. As used herein, the term "lubricating powder" is intended to include either graphite or mica powder.

A preferred release agent of this invention comprises a mixture of the following ingredients:

| | Parts, inclusive |
|---|---|
| Water | 45–200 |
| Bentonite (Western) | 3–12 |
| Graphite | 20–30 |
| Soap | 10–20 |

Furthermore, we have discovered that a stable thixotropic gel release agent comprising water in an amount between 45–65 parts, inclusive, gel forming mineral powder such as Western bentonite in an amount between 3–12 parts, inclusive, lubricating powder such as graphite in an amount between 20–30 parts, inclusive, and soap in an amount between 4–8 parts, inclusive, can be produced only if a critical mixing order is observed. The resulting release agent can be applied to shaping surfaces by brushing the gel thereon, and alternatively can be applied by spraying a suspension prepared by admixing one part of the gel with from one to three parts of water. Spraying of such a mixture is preferred, in some instances, since there is less tendency for the coating or release agent to build up in fine corners when the spraying method of application is employed than when the painting method of application is used. Also, this release agent is tolerant of the presence of additional chemicals, e.g., methanol, which are sometimes desirable to prevent freezing of the suspension.

DESCRIPTION OF THE PREFERRED EMBODIMENTS

In the following examples all the amounts are given in parts by weight and percent (or %) refers to percent by weight.

EXAMPLE 1

Water (150 parts) and Western bentonite (15 parts) were stirred together for approximately one hour. This resulted in a gel-like suspension. To this suspension a 40 percent aqueous sodium soap of coconut oil (51 parts) was admixed and stirred at low speed for approximately 30 minutes. To the resulting suspension graphite powder (84 parts) was added, and the resulting admixture was stirred first at low speed and then at high speed for 2 hours. The final suspension appeared smooth, although some air was trapped in the mix. The resulting thixotropic gel was stored in cans which were lined with a phenolic coating. The stored material remained stable for a prolonged period of time.

EXAMPLE 2

A mixture of 53.5 percent water, 3.5 percent Western bentonite, 24 percent graphite, 6 percent sodium soap of coconut oil, and 13 percent methanol was prepared by mixing the ingredients in the sequence stated. The resulting mixture was stored in unlined pails during a storage test which was extended for approximately a one month period. During this period the formulation appeared to remain homogeneous and no separation or lumping was observed.

EXAMPLE 3

The purpose of this example is to illustrate the criticality of the mixing sequence. To a mixture of 10 parts Western bentonite and 56 parts of graphite was added 34 parts of 40 percent solids soap. The soap was a sodium soap of coconut oil. The resulting mixture was a dry mass which could not be considered a paste. Upon the addition of 100 parts of water a stable suspension was not obtained, nor was the resulting mixture a thixotropic gel. Stirring the resulting mixture for an 8 hour period did not increase its stability or viscosity. A repeat of the test gave the same results and no change was noted after the mixtures which had been prepared in this example had stood for several days.

As the result of a series of experiments designed to test the importance of mixing sequence, we have concluded that it is essential that the water and the Western bentonite be mixed first, and that the bentonite be given the opportunity to hydrate prior to the addition of either the graphite or the soap ingredients.

EXAMPLE 4

The purpose of this example is to compare the gellant used in the coating agent of this invention with a series of other gellants. A series of 5 gels were prepared using the gelling agent employed in this invention and using some other gelling agents which are commercially available. The gels were prepared by mixing the gelling agents in water in the concentrations set forth in Table 1. The viscosity of each gel is set forth in Table 1, in which viscosity is expressed as cps. at 25° C. (using No. 3 spindle on a Brookfield viscometer). To each of the gels (55 parts) was added the following ingredients: 40 percent solids sodium soap of coconut oil (17 parts), graphite powder (28 parts). Each of the resulting mixtures were stirred or shaken until homogeneous suspensions were formed. On standing overnight all of the resulting mixtures except the Western bentonite-containing mixture had separated, leaving a water layer and a dense sludge layer. The degree of severity of the separation corresponded to the sequence in which the samples appear in Table 1, with the exception of tests 4-5.

TABLE 1

| Test | Gellant [1] | Concentration, percent | Viscosity—r.p.m. |
|---|---|---|---|
| 4-1 | A | 2.0 | 4,500—12<br>3,100—30 |
| 4-2 | B | 1.0 | 2,100—12<br>1,560—30 |
| 4-3 | C | 0.4 | 2,950—6<br>1,938—12 |
| 4-4 | D | 0.5 | 1,300—30<br>920—60 |
| 4-5 | E | 10.0 | 1,440—30<br>800—60 |

[1] A—High mol. wgt. nonionic polyacrylamide, B—Carboxymethyl cellulose, C—High mol. wgt. anionic polyacrylamide, D—A commercial anionic polyacrylamide, E—Western bentonite.

In a separate series of tests several corn flours were evaluated as gellants but were found to be completely unsatisfactory. Major variations in viscosity were noted with minor changes in extent of stirring. Also, mold growths, which were at times severe, were noted in each of the suspensions in which corn flour was used.

EXAMPLE 5

The purpose of this example is to illustrate the use of the release agent of this invention in the fabrication of a foundry core. To the wooden surface of a foundry core box the coating agent of this invention, which was produced in accordance with Example 1, was painted in a uniform manner. The coating thus applied was allowed to dry overnight. Foundry sand, moist with furfuryl alcohol resin binder, was applied to the shaping surface and was permitted to cure while in contact therewith. The sand and core box was thereupon inverted and when the box was subjected to a light tap, the cured shape gently fell from the core box. Previous attempts to produce a shaped sand article from the same core box required heavy blows with a sledge hammer in order to secure the release of the cured sand shape therefrom. The coated core box was then repeatedly used until 12 sand shapes were produced therefrom, and in each instance the sand shape was immediately released therefrom by a light tap. Prior to the use of our release agent, in some instances, the box had to be disassembled in order to release the cured sand shape.

EXAMPLE 6

The release agent produced in accordance with Example 2 above was painted on an aluminum pattern and the coating was permitted to dry. Foundry sand, bound with fluid furfuryl alcohol resin, was applied to the surface and permitted to cure while in contact therewith. The cured sand shape was found to separate readily from the aluminum shaping surface. This procedure was repeated and it was found that 3 molds could be produced from the coated aluminum pattern before it required repainting with the release agent.

EXAMPLE 7

The purpose of this example is to demonstrate the fact that the coating of this invention is a non-flammable coating. In two separate tests brand new wooden core boxes were coated with release agents. In the first test a commercially available release agent, presumably containing a considerable quantity of alcohol, was used to coat the core box. In a second test a second core box was coated with the release agent of this invention which was prepared as in Example 2, and therefore contained 13% methanol. In close proximity to each freshly coated core box a welding operation was carried out. Sparks from the welding operation ignited the brand new core box to which the flammable release agent had been applied and in very short time the core box was ruined. Quite to the contrary, however, there was no visible damage to the core box which was coated with the release agent of this invention as a result of the contact of the welding sparks therewith.

EXAMPLE 8

The release agent of this invention which was produced in accordance with Example 2 above was diluted with 3 parts of water for each part of the gel and stirred vigorously. While the resulting suspension was found to be relatively unstable, it was nonetheless sufficiently stable to be used in conjunction with a conventional spraying apparatus. The material thus produced was sprayed on a wooden core box and the resulting coating was permitted to dry overnight. Foundry sand, moist with a furfuryl alcohol paste resin binder, was packed in contact with the shaping surfaces of the core box so coated. Upon curing of the mix it was found that the resulting sand shape was readily removed from the core box by simply inverting the core box and subjecting the core box to a light tap.

As will be appreciated from the above examples, use of the thixotropic gel produced in accordance with this invention leads to a vast improvement in the release of furfuryl alcohol bound sand shapes from shaping surfaces.

We have found that the stable gel of this invention remains entirely homogeneous for prolonged periods of time when stored in coated cans, e.g., cans coated with phenolic resins. For some unexplained reason, however, we have observed that when the gel is stored in contact with phosphatized metal, a certain degree of lumping is observed at the can wall after prolonged storage periods. However, this type of can is unobjectionable if the gel is to be used within a relatively short period of time.

As used herein the word "powder" is defined as any material which will pass 95 percent through a 200 mesh screen. While Western bentonite has been used in the preferred embodiments of this invention, it should be emphasized that the gel forming mineral powder need not be limited to Western bentonite. It should also be noted, however, that not all bentonites are suitable for use in this invention. Western bentonite is a gel forming mineral powder (when admixed with water) and is sometimes referred to as a "swelling bentonite."

Other "swelling" mineral (i.e. inorganic) powders, e.g. the pyrogenic silica swelling powder known as Cabosil (trademark of Cabot Corp.), and the colloidal alumina swelling powder known as Baymal (trademark of E. I. du Pont) are useful as gel forming mineral powders in accordance with this invention. Southern bentonite, however, will not work. Southern bentonites are sometimes referred to as non-swelling bentonites.

Also, sodium soap of coconut oil has been used in the preferred embodiments described above. However, the soap ingredient is in no way limited to this particular soap. Any sodium or potassium soap may be used in the formulation of the composition of this invention.

In the above description it is apparent that the release agent of this invention is highly advantageous when used on shaping surfaces during the fabrication of sand shapes which are bound with furfuryl alcohol-based foundry binders. However, we have found the results are also satisfactory when used in conjunction with other binders, e.g., alkyd diisocyanate binders.

Therefore I claim:

1. A method of making an aqueous static mold release agent which is in the form of a stable thixotropic gel comprising the steps:
(A) forming a gel by admixing water in an amount between 45–65 parts, inclusive, and a gel forming mineral powder in an amount between 3–12 parts, inclusive, said gel forming mineral powder comprising a member selected from the group consisting essentially of swelling bentonites, pyrogenic silica swelling powders, and colloidal alumina swelling powders;
(B) admixing the above gel with a lubricating powder in an amount between 20–30 parts, inclusive, said lubricating powder comprising a member selected from the group consisting essentially of graphite and mica powder, and soap in an amount between 4–8 parts, inclusive, said soap comprising a sodium or potassium soap; and
(C) agitating the resulting admixture to produce a homogeneous suspension of the ingredients.

References Cited

UNITED STATES PATENTS

| Re. 19,396 | 12/1934 | Wallace | 106—38.28 XR |
| 2,270,770 | 1/1942 | Ray | 106—38.25 |
| 2,544,598 | 3/1951 | Kalina | 106—38.23 XR |
| 2,683,296 | 7/1954 | Drumm et al. | |
| 2,735,814 | 2/1956 | Hodson et al. | |
| 3,074,802 | 1/1963 | Alexander et al. | 106—38.3 |
| 3,275,460 | 9/1966 | Jeanneret | 106—38.22 |

DONALD J. ARNOLD, Primary Examiner

L. B. HAYES, Assistant Examiner

U.S. Cl. X.R.

106—38.22, 266; 117—5.2